(12) United States Patent
Bhatia et al.

(10) Patent No.: US 9,337,899 B2
(45) Date of Patent: May 10, 2016

(54) METHODS AND APPARATUS FOR SECURE UPDATES TO PERSISTENT DATA IN A NEAR FIELD COMMUNICATION CONTROLLER

(75) Inventors: Neeraj Bhatia, San Francisco, CA (US); Jeremy R. O'Donoghue, Wokingham (GB); Anssi Kaleva Haverinen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 920 days.

(21) Appl. No.: 13/591,827

(22) Filed: Aug. 22, 2012

(65) Prior Publication Data

US 2013/0217323 A1     Aug. 22, 2013

Related U.S. Application Data

(60) Provisional application No. 61/598,099, filed on Feb. 13, 2012.

(51) Int. Cl.
*H04W 12/00* (2009.01)
*H04B 5/00* (2006.01)
*H04L 29/06* (2006.01)

(52) U.S. Cl.
CPC .......... *H04B 5/0031* (2013.01); *H04L 63/0492* (2013.01); *H04L 63/0853* (2013.01); *H04W 12/00* (2013.01)

(58) Field of Classification Search
USPC ............. 455/41.1, 41.2, 562.1, 558, 561, 419
See application file for complete search history.

(56) References Cited

U.S. PATENT DOCUMENTS

| | | | |
|---|---|---|---|
| 8,171,525 B1 | 5/2012 | Pelly et al. | |
| 2007/0263595 A1 | 11/2007 | Charrat | |
| 2008/0162312 A1* | 7/2008 | Sklovsky | G06Q 20/32 705/35 |
| 2008/0162361 A1* | 7/2008 | Sklovsky | G06Q 20/32 705/65 |
| 2010/0178868 A1* | 7/2010 | Charrat | G06Q 20/3278 455/41.1 |

(Continued)

FOREIGN PATENT DOCUMENTS

| | | |
|---|---|---|
| FR | 2913546 A1 | 9/2008 |
| KR | 20070037810 | 4/2007 |
| WO | 2011110438 A1 | 9/2011 |

OTHER PUBLICATIONS

Madlmayr, et al., "The benefit of using SIM application toolkit in the context of near field communication applications," IEEE Proceedings from the 6th Annual ICMB: Int'l Conf. on the Mgmt of Mobile Bus., 2007.

(Continued)

*Primary Examiner* — Ganiyu A Hanidu
(74) *Attorney, Agent, or Firm* — Joseph Hanansz

(57) ABSTRACT

Disclosed are methods, apparatus, systems, computer program products, and other implementations, including a method that includes determining a source from which routing table information is to be obtained based, at least in part, on location data indicating the source, and receiving configuration information from a device host (DH). The method also includes removing DH-based routing table information included in the configuration information in response to the location data indicating that a near-field communication controller (NFCC) is configured to receive the routing table information from one or more secure computing environments or from the DH, and obtaining secure routing table information from at least one of the one or more secure computing environments.

48 Claims, 8 Drawing Sheets

(56) References Cited

U.S. PATENT DOCUMENTS

| | | | | |
|---|---|---|---|---|
| 2010/0227553 | A1* | 9/2010 | Charrat | G06Q 20/341 455/41.1 |
| 2011/0130095 | A1* | 6/2011 | Naniyat | G06K 7/0008 455/41.1 |
| 2012/0178366 | A1* | 7/2012 | Levy | G06K 7/10237 455/41.1 |
| 2013/0309971 | A1* | 11/2013 | Kiukkonen | H04L 63/107 455/41.2 |

OTHER PUBLICATIONS

International Search Report and Written Opinion—PCT/US2013/025773—ISA/EPO—May 22, 2013.

* cited by examiner

METHODS AND APPARATUS FOR SECURE UPDATES TO PERSISTENT DATA IN A NEAR FIELD COMMUNICATION CONTROLLER

CROSS-REFERENCE TO RELATED APPLICATION

This application claims the benefit of and priority to provisional U.S. application Ser. No. 61/598,099, entitled "METHODS AND APPARATUS FOR SECURE UPDATES TO PERSISTENT DATA IN AN NEAR FIELD COMMUNICATION CONTROLLER," and filed Feb. 13, 2012, the content of which is incorporated herein by reference in its entirety.

BACKGROUND

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. Portable wireless telephones, for example, further include cellular telephones that can communicate voice and data packets over wireless networks. Many such cellular telephones are being manufactured with relatively large increases in their computing capabilities, and as such, are becoming tantamount to small personal computers and hand-held PDAs. Furthermore, such devices are being manufactured to enable communications using a variety of frequencies and applicable coverage areas, such as cellular communications, wireless local area network (WLAN) communications, near field communication (NFC), etc.

In current NFC systems, data routing is performed according to one or more routing tables, which are often downloaded from a device host (DH) and stored at an NFC controller (NFCC) in a storage device (e.g., a memory device). As the data residing on a DH may be altered and/or reprogrammed, a routing table residing on the DH can be compromised by interlopers who may seek to carry out, for example, a "denial-of-service" attack using the altered routing table.

SUMMARY

In some variations, a method is disclosed that includes determining a source from which routing table information is to be obtained based, at least in part, on location data indicating the source, and receiving configuration information from a device host (DH). The method also includes removing DH-based routing table information included in the configuration information in response to the location data indicating that a near-field communication controller (NFCC) is configured to receive the routing table information from one or more secure computing environments or from the DH, and obtaining secure routing table information from at least one of the one or more secure computing environments.

Embodiments of the method may include at least some of the features described in the present disclosure, including one or more of the following features.

Determining the source may include determining that one or more routing table location option bits are set to allow the NFCC to receive the routing table information from the one or more secure computing environments or from the DH.

The one or more routing table location option bits may be unchangeable and stored on a non-volatile memory.

The one or more routing table location option bits may be changeable.

Removing the DH-based routing table information included in the received configuration information may include one of, for example, discarding the DH-based routing table information included in the configuration information received from the DH, and storing the DH-based routing table information included in the configuration information received from the DH.

The method may further include obtaining the DH-based routing table information in response to a determination of failure to obtain the secure routing table information from the at least one of the one or more secure computing environments. Obtaining the DH-based table information may include one of, for example, obtaining the DH-based routing table information stored at the DH, and obtaining the removed routing table information from a storage device coupled to the NFCC, the storage device storing the removed DH-based routing table information after the removal of the DH-based routing table information from the configuration information received from the DH.

The one or more secure computing environments may include a first secure computing environment and a second secure computing environment, and the method may further include receiving first routing table information associated with the first secure computing environment and second routing table information associated with the second secure computing environment, and selecting the first routing table information. The method may further include selecting the first routing table information and the second routing table information, and combining the first routing table information and the second routing table information to produce a hybrid routing table.

The method may further include receiving secure routing table information priority data associated with the one or more secure computing environments, and determining based on the received secure routing table information priority data whether to utilize the secure routing table information obtained from the at least one of the one or more secure computing environments or to obtain the DH-based routing table information from the DH.

The at least one of the one or more secure computing environments may be selected from the group consisting of, for example, a secure element, a virtual secure element, an NFC execution environment, a smart card, a universal integrated circuit card, a subscriber identity module, an SD Card containing the secure computing environment, and/or a Universal Serial Bus (USB)-based device containing the secure computing environment.

The one or more secure computing environments may be removable.

The one or more secure computing environments may be fixed.

In some variations, an apparatus for wireless communication is disclosed. The apparatus includes means for determining a source from which routing table information is to be obtained based, at least in part, on location data indicating the source, and means for receiving configuration information from a device host (DH). The apparatus further includes means for removing DH-based routing table information included in the configuration information in response to the location data indicating that a near-field communication controller (NFCC) is configured to receive the routing table information from one or more secure computing environments or from the DH, and means for obtaining secure routing table information from at least one of the one or more secure computing environments.

Embodiments of the apparatus may include at least some of the features described in the present disclosure, including at least some of the features described above in relation to the method, as well as one or more of the following features.

The means for determining the source may include means for determining that one or more routing table location option bits are set to allow the NFCC to receive the routing table information from the one or more secure computing environments or from the DH.

The means for removing the DH-based routing table information included in the received configuration information may include one of, for example, means for discarding the DH-based routing table information included in the configuration information received from the DH, and means for storing the DH-based routing table information included in the configuration information received from the DH.

The apparatus may further include means for obtaining the DH-based routing table information in response to a determination of failure to obtain the secure routing table information from the at least one of the one or more secure computing environments. The means for obtaining the DH-based table information may include one of, for example, means for obtaining the DH-based routing table information stored at the DH, and means for obtaining the removed routing table information from a storage device coupled to the NFCC, the storage device storing the removed DH-based routing table information after the removal of the DH-based routing table information from the configuration information received from the DH.

The one or more secure computing environments may include a first secure computing environment and a second secure computing environment, and the apparatus may further include means for receiving first routing table information associated with the first secure computing environment and second routing table information associated with the second secure computing environment, and means for selecting the first routing table information.

The apparatus may further include means for selecting the first routing table information and the second routing table information, and means for combining the first routing table information and the second routing table information to produce a hybrid routing table.

The apparatus may further include means for receiving secure routing table information priority data associated with the one or more secure computing environments, and means for determining based on the received secure routing table information priority data whether to utilize the secure routing table information obtained from the at least one of the one or more secure computing environments or to obtain the DH-based routing table information from the DH.

In some variations, a computer program product is disclosed. The computer program product includes a computer-readable medium comprising code for determining a source from which routing table information is to be obtained based, at least in part, on location data indicating the source, and receiving configuration information from a device host (DH). The computer-readable medium further includes code for removing DH-based routing table information included in the configuration information in response to the location data indicating that a near-field communication controller (NFCC) is configured to receive the routing table information from one or more secure computing environments or from the DH, and for obtaining secure routing table information from at least one of the one or more secure computing environments.

Embodiments of the computer program product may include at least some of the features described in the present disclosure, including at least some of the features described above in relation to the method and apparatus, as well as one or more of the following features.

The code for determining the source may include code for determining that one or more routing table location option bits are set to allow the NFCC to receive the routing table information from the one or more secure computing environments or from the DH.

The code for removing the DH-based routing table information included in the received configuration information may include code for one of, for example, discarding the DH-based routing table information included in the configuration information received from the DH, and storing the DH-based routing table information included in the configuration information received from the DH.

The computer program product may further include code for obtaining the DH-based routing table information in response to a determination of failure to obtain the secure routing table information from the at least one of the one or more secure computing environments. The code for obtaining the DH-based table information may include code for one of, for example, obtaining the DH-based routing table information stored at the DH, and obtaining the removed routing table information from a storage device coupled to the NFCC, the storage device storing the removed DH-based routing table information after the removal of the DH-based routing table information from the configuration information received from the DH.

The one or more secure computing environments may include a first secure computing environment and a second secure computing environment, and the code may further include code for receiving first routing table information associated with the first secure computing environment and second routing table information associated with the second secure computing environment, and selecting the first routing table information.

The computer program product may further include code for selecting the first routing table information and the second routing table information, and combining the first routing table information and the second routing table information to produce a hybrid routing table.

The computer program product may further include code for receiving secure routing table information priority data associated with the one or more secure computing environments, and determining based on the received secure routing table information priority data whether to utilize the secure routing table information obtained from the at least one of the one or more secure computing environments or to obtain the DH-based routing table information from the DH.

In some variations, another apparatus for wireless communication is disclosed. The apparatus includes at least one processor, and a memory coupled to the at least one processor. The at least one processor is configured to determine a source from which routing table information is to be obtained based, at least in part, on location data indicating the source, and to receive configuration information from a device host (DH). The at least one processor is further configured to remove DH-based routing table information included in the configuration information in response to the location data indicating that a near-field communication controller (NFCC) is configured to receive the routing table information from one or more secure computing environments or from the DH, and to obtain secure routing table information from at least one of the one or more secure computing environments.

Embodiments of the apparatus may include at least some of the features described in the present disclosure, including at least some of the features described above in relation to the method, the first apparatus, and the computer program product, as well as one or more of the following features.

The at least one processor configured to determine the source may be configured to determine that one or more routing table location option bits are set to allow the NFCC to receive the routing table information from the one or more secure computing environments or from the DH.

The at least one processor configured to remove the DH-based routing table information included in the received configuration information may be configured to perform one of, for example, discard the DH-based routing table information included in the configuration information received from the DH, and store the DH-based routing table information included in the configuration information received from the DH.

The at least one processor may be further configured to obtain the DH-based routing table information in response to a determination of failure to obtain the secure routing table information from the at least one of the one or more secure computing environments. The at least one processor configured to obtain the DH-based table information may be configured to perform one of, for example, obtain the DH-based routing table information stored at the DH, and obtain the removed routing table information from a storage device coupled to the NFCC, the storage device storing the removed DH-based routing table information after the removal of the DH-based routing table information from the configuration information received from the DH.

The one or more secure computing environments may include a first secure computing environment and a second secure computing environment, and the at least one processor may further be configured to receive first routing table information associated with the first secure computing environment and second routing table information associated with the second secure computing environment, and select the first routing table information.

The at least one processor may further be configured to select the first routing table information and the second routing table information, and combine the first routing table information and the second routing table information to produce a hybrid routing table.

The at least one processor may further be configured to receive secure routing table information priority data associated with the one or more secure computing environments, and determine based on the received secure routing table information priority data whether to utilize the secure routing table information obtained from the at least one of the one or more secure computing environments or to obtain the DH-based routing table information from the DH.

Unless defined otherwise, all technical and scientific terms used herein have the same meaning as commonly or conventionally understood. As used herein, the articles "a" and "an" may refer to one or to more than one (i.e., to at least one) of the grammatical object of the article. By way of example, "an element" means one element or more than one element. "About" and/or "approximately" as used herein when referring to a measurable value such as an amount, a temporal duration, and the like, is meant to encompass variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, is also meant to encompass variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Other and further objects, features, embodiments, implementations, aspects, and advantages of the present disclosure will become better understood with the following detailed description of the accompanying drawings.

BRIEF DESCRIPTION OF THE DRAWINGS

The disclosed aspects will hereinafter be described in conjunction with the following drawings, provided to illustrate and not to limit the disclosed implementations, wherein like designations denote like elements.

Like reference symbols in the various drawings indicate like elements.

DETAILED DESCRIPTION

Various implementations and aspects are now described with reference to the drawings. In the following description, for purposes of explanation, numerous specific details are set forth in order to provide a thorough understanding of one or more aspects. It may be evident, however, that such implementations and aspects may be practiced without these specific details.

Thus, disclosed herein are methods, apparatus, devices, computer program products, and other implementations, including a method that includes determining a source of routing table information based on data indicating the source (e.g., determining that one or more routing table location option bits are set to allow a NFC controller (NFCC) to receive routing table information at least from one or more secure computing environments and/or from a device host (DH)). The method also includes receiving configuration information from the DH, removing routing table information included in the received configuration information (e.g., in response to the source-indicating data indicating that a near-field communication controller (NFCC) is configured to receive the routing table information from one or more secure computing environments or from the DH), and obtaining secure routing table information from at least one of the one or more secure computing environments (e.g., by querying the one or more secure computing environments and receiving the secure routing table information from the at least one of the one or more secure computing environments). In some variations, removing the routing table information included in the received configuration information includes one of, for example, discarding the routing table information included in the configuration information received from the DH (i.e., the routing table information may or may not be recoverable after it was discarded depending, for example, on whether a storage medium that held the routing table information from the configuration information was overwritten), and storing the routing table information included in the configuration information received from the DH.

Generally, a near field communication (NFC) device maintains data routing information in one or more data routing tables in an NFC controller (NFCC) located at the NFC device. These data routing tables may control data flow in a NFC environment between modules in the NFC environment, and may include, but are not limited to, data for the NFC Technology used on the RF interface (e.g. Type A, B or F), protocol type data, Application Identifier (AID) data, Source Address Point (SSAP) data, Destination Address Point (DSAP) data, and/or higher layer data such as a URI. Obtaining trusted data routing tables from one or more secure computing environments, as opposed to receiving routing table information from a device or module that is susceptible/vulnerable to being manipulated by rogue parties, lessens the likelihood of receiving altered and/or hacked routing table information.

Figure 1:
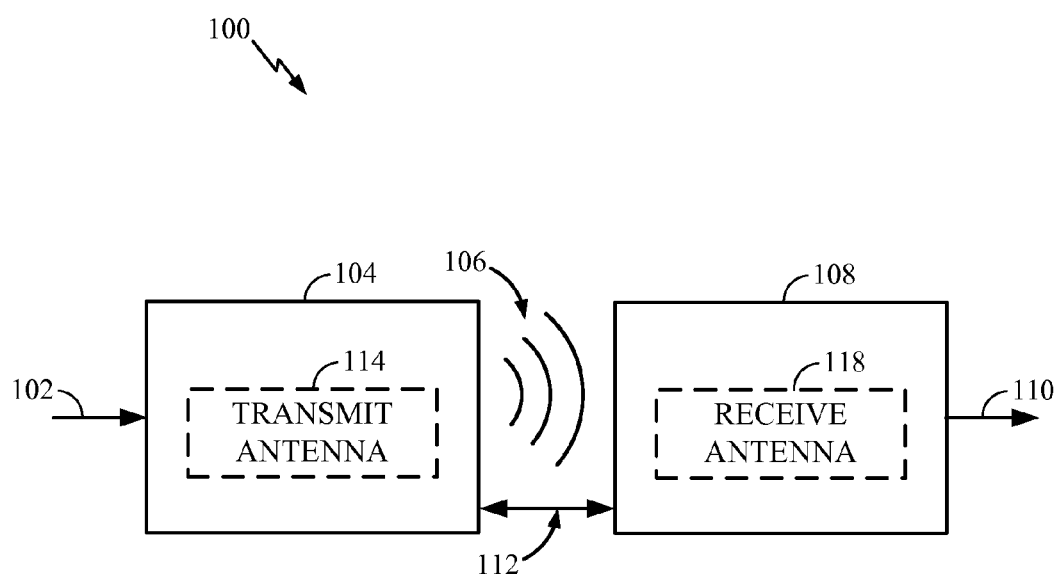
FIG. 1 illustrates a schematic block diagram of an example near field wireless communication system.

FIG. 1 illustrates a schematic diagram of a wireless communication system 100, in accordance with various example embodiments of the present disclosure. Input power 102 is provided to a transmitter 104 for generating a radiated field 106 for providing energy transfer (e.g., corresponding to transmissions of NFC signals). A receiver 108 receives the radiated field 106 and generates an output power 110 for storing or consumption by a device (not shown) coupled to the output power 110. Both the transmitter 104 and the receiver 108 are separated by a distance 112. In some implementations, the transmitter 104 and the receiver 108 are configured in accordance with a mutual resonant relationship. When the resonant frequency of receiver 108 and the resonant frequency of transmitter 104 are very close, transmission losses between the transmitter 104 and the receiver 108 are relatively small (and may be minimal) when the receiver 108 is located in the "near-field" of the radiated field 106.

The transmitter 104 includes a transmit antenna 114 for providing a mechanism for energy transmission, and the receiver 108 includes a receive antenna 118 for providing a mechanism for energy reception. The transmit and receive antennas are sized according to applications and devices to be associated therewith. Efficient energy transfer can occur by coupling a large portion of the energy in the near-field of the transmit antenna to a receive antenna rather than propagating most of the energy in an electromagnetic wave to a far field. In such a near-field, a coupling mode may be developed between the transmit antenna 114 and the receive antenna 118. The area around the antennas 114 and 118 where this near-field coupling may occur is referred to as a coupling-mode region.

Figure 2:
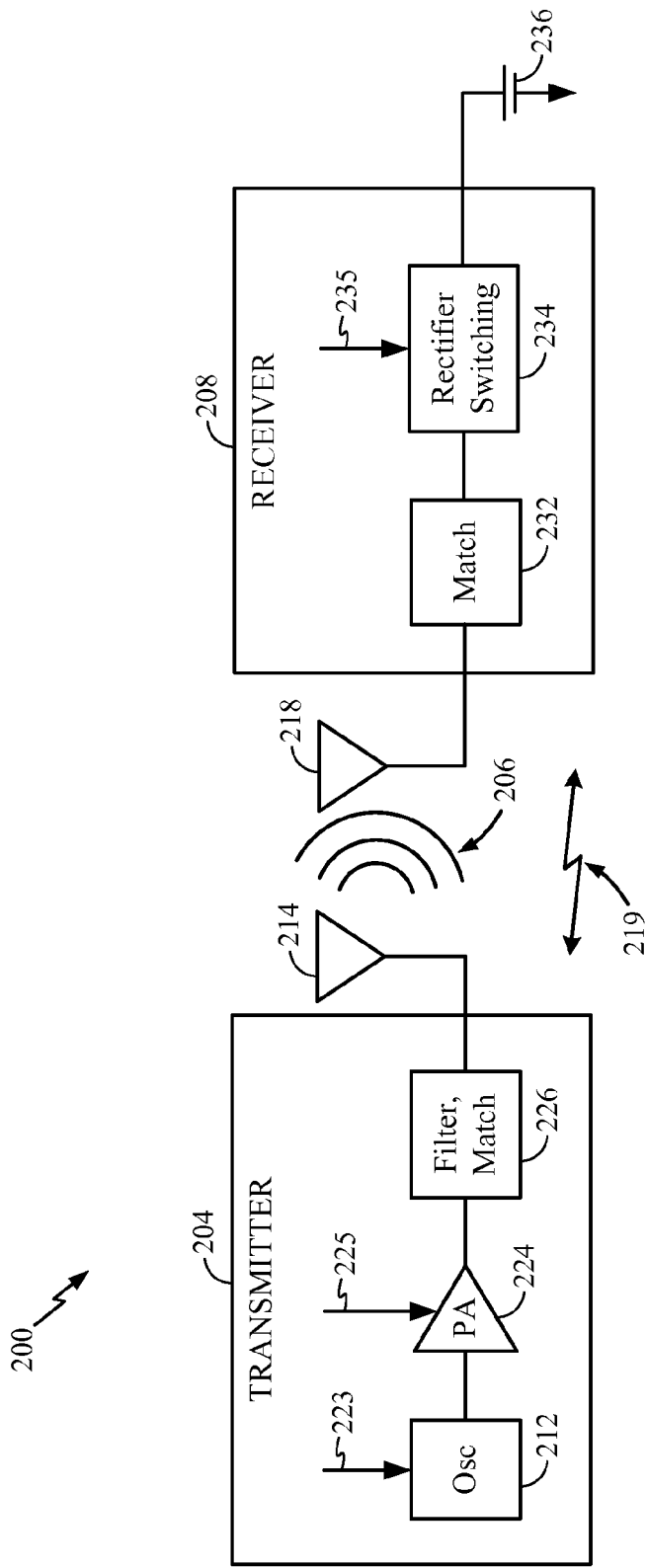
FIG. 2 illustrates a schematic diagram of another example near field communication transfer system.

With reference to FIG. 2, a simplified schematic diagram of a near field wireless communication system 200 is shown. The transmitter 204 (which may be similar to the transmitter 104) includes an oscillator 212, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to a control signal 225. The filter and matching circuit 226 may be included to filter out harmonics, or other unwanted frequencies, and match the impedance of the transmitter 204 to the transmit antenna 214.

The receiver 208 (which may be similar to the receiver 108 of FIG. 1) may include a matching circuit 232 and a rectifier and switching circuit 234 to generate a DC power output to charge a battery 236, as shown in FIG. 2, or to power a device coupled to the receiver (not shown). Operation of the rectifier and switching circuit/module may be controlled, at least in part, based on control signal from control input 235 (shown coupled to the rectifier switching circuit 234, but the signal 235 may also be coupled to the matching circuit 233). The matching circuit 232 may be included to match the impedance of the receiver 208 to the receive antenna 218. The receiver 208 and transmitter 204 may communicate on a separate communication channel 219 (e.g., Bluetooth, zigbee, cellular, etc).

Figure 3:
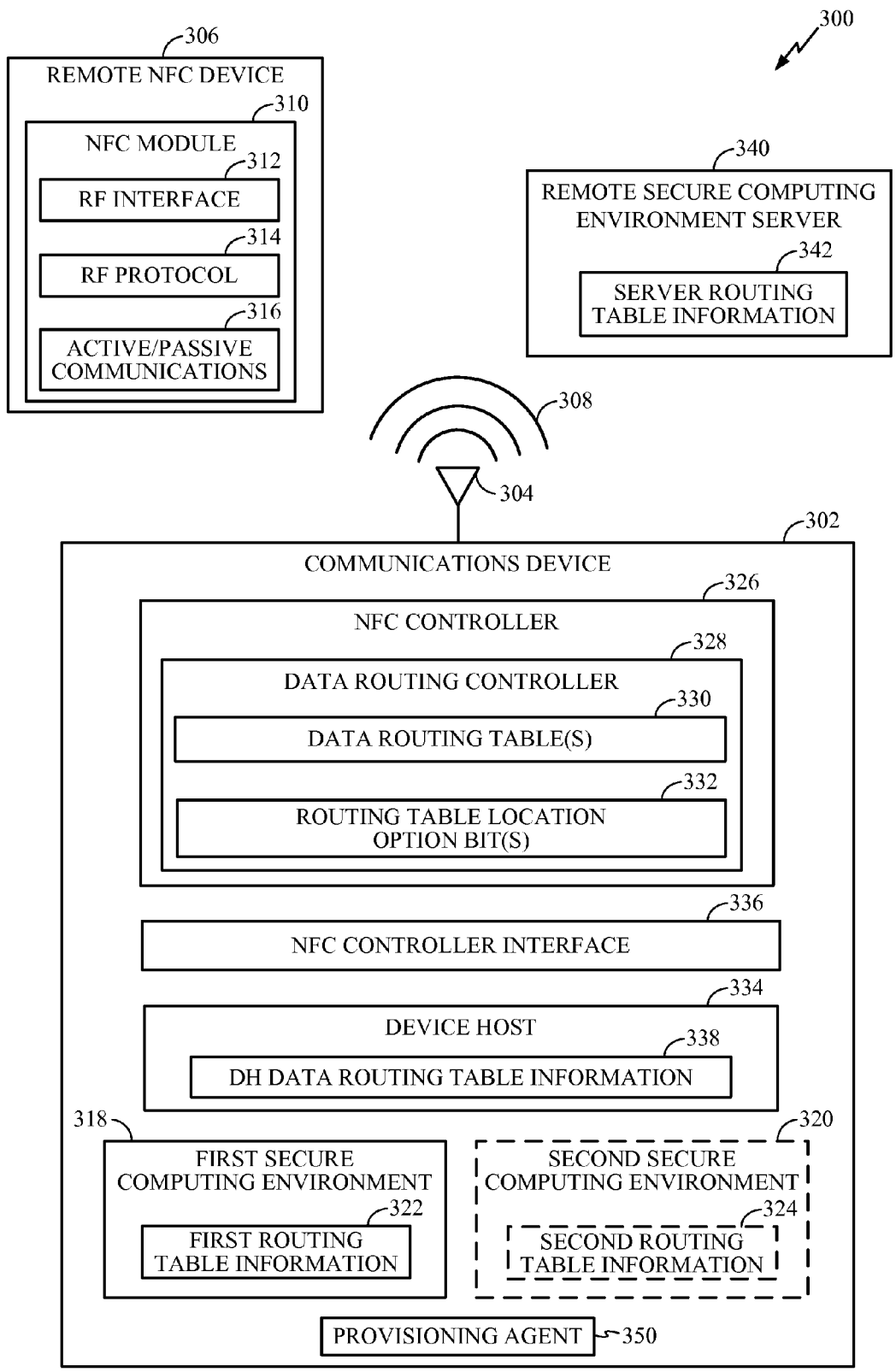
FIG. 3 illustrates a block diagram of a Near Field Communication (NFC) environment.

With reference to FIG. 3, a block diagram of a communication network 300 is shown. The communication network 300 may include a communications device 302 which, through antenna 304, may communicate with a remote NFC device 306 through implementation of one or more NFC-based technologies (e.g., NFC-A, NFC-B, NFC-F, etc.). FIG. 3 depicts communication signals 308 from the device 302 (via the antenna 304) to at least the device 306. In some variations, the remote NFC device 306 and/or the communication device 302 may be operable to communicate via an NFC module 310 (depicted as being included with the remote device 306) which includes one or more RF interfaces 312 communicating based on one or more RF protocols 314 in either an active or passive communication mode 316. In some implementations, the communications device 302 may be configured to be connected to an access network and/or core network (e.g., a CDMA network, a GPRS network, a UMTS network, and/or other types of wired or wireless communication networks). In some variation, the remote NFC device 306 may include, but is not limited to, a remote NFC tag, a reader/writer device, a peer initiator device, a remote peer target device, etc.

In some variations, the communications device 302 may include one or more secure computing environments, such as, but not limited to, a first secure computing environment 318 and an optionally second secure computing environment 320. In addition, the first secure computing environment 318 may include a first routing table information 322, and the second secure computing environment 320 may include a second routing table information 324. Although two secure computing environments are depicted in FIG. 3, the communications device 302 may include any number of additional secure computing environments (not shown), each of which may likewise store routing table information. The first and/or the second secure computing environments 318 and/or 320 may be configured to communicate with an NFC controller 326. Furthermore, the first and/or the second secure computing environments 318 and/or 320 may include one or more applications that are operable to request access to various modules, and to various functionalities, via the NFC controller 326. The first and/or the second secure computing environments 318 and/or 320 may include a secure element, a near field communication execution environment (NFCEE), a virtual secure element, a smart card, an SD Card containing the secure computing environment, and a Universal Serial Bus (USB)-based device containing the secure computing environment etc. In some variations, the first and/or the second secure computing environments 318 and/or 320 may include a Universal Integrated Circuit Card (UICC) with various modules such as, but not limited to, a subscriber information/identity module (SIM), a CDMA Subscriber Identity Module (CSIM), etc. The secure computing environments 318 and/or 320 may be removable modules that can be removed or added to a housing of the communication device 302. Each of the one or more secure computing environments included with the device 302 (or coupled thereto) may be distinguished by the NFC controller 326 using a secure computing environment identifier for use during the RF discovery process.

As noted, the communications device 302 may include the NFC controller (NFCC) 326 that communicates with the one or more secure computing environments, and may be configured to facilitate NFC operation of the communication device 302. As will be discussed in greater details below, in some implementations, the NFCC is configured to determine, based on one or more routing table location option bits (e.g., the values such option bits are set to) whether to receive routing table information from the one or more secure computing environments or from a device host (DH) (e.g., a module coupled to the communication device which holds information, such as routing information). The NFCC is also configured to receive configuration information from the DH, remove (e.g., if the options bits indicate that the NFCC may obtain routing information from the secured computing environments or from the DH) routing table information included in the received configuration information, and obtain secure routing table information from at least one of the one or more secure computing environments. In some embodiments, the NFC controller 326 may include a data routing controller 328, which may control data routing between components in the communications device 302 and/or the communications network 300. Furthermore, the data routing controller 328 may utilize one or more data routing tables 330 that govern the data routing operation of data routing controller 328. The data routing tables 330 may be loaded with routing table information from one or more of the device host (DH) 334 and/or one or more secure computing environments such as, but not limited to the first and/or the second secure computing environments 318 and/or 320. As noted, determination of whether to obtain routing table information from the one or more secure computing environments or the DH is based, at least in part, on the configuration/values of the location bits (generally stored at the element 332 of the communication device 302). Priority data associated with the secure routing table information, availability of routing table information, etc., may also play a role in determining which (e.g., the source of) routing table information is written into the data routing tables 330. In some implementations, the option bits may be located in other locations which may be locally or remotely accessible by the device 302. The one or more routing table location option bits 332 may be stored on a non-volatile memory and/or be unchangeable, or may not be allowed to be altered. Alternatively, the one or more routing table location option bits 332 may be located on a volatile memory and/or may be changeable. In some embodiments, the NFCC 326, which implements, for example, an NCI communications protocol to communicate with the DH 334, may use specially reserved bits in the NFCC Feature Octets 1 and 2 to indicate, e.g., in a CORE_INIT_RSP message, the routing table location information to the DH.

Thus, the NFCC 326 may be set to receive routing table information from the DH 334 and/or from secure computing environments, such as the first and the second secure computing environments 318 and 320, for use in data routing by the data routing controller 328. In some embodiments, if the location data (e.g., the location option bits) indicate that routing table information can be retrieved from either the secure computing environment(s) or the DH, the NFCC may attempt to retrieve the routing table data according to some predetermined order or procedure. For example, the NFCC 326 may first access the first secure environment to retrieve the routing table information, and may access the second secure environment and/or the DH device in the event that the first secure environment does not include, or has incomplete, routing table information, and/or when routing table information in the first secure environment needs to otherwise be supplemented.

As further illustrated in FIG. 3, the communication device 302 also includes, in some implementations, an NFC Controller Interface (NCI) 336. The NCI 336 may be operable to enable communications between a NFC enabled antenna and NFC controller 326. Furthermore, in some implementations, the NCI 336 may be operable to function in a listening mode and/or a polling mode. Additionally, the NCI 336 may enable communications between NFC controller 326 and one or more of the DH 334, the secure computing environments (such as the first and the second secure computing environments 318 and 320 depicted in FIG. 3), and/or with any other component of communications device 302.

The device host (DH) 334, which includes DH data routing table information 338 (e.g., stored on a storage device/unit at the DH 334) may provide the DH data routing table information 338 for storage in the one or more data routing tables 330 of the data routing controller 328 in the NFCC 326. This DH routing table information 338 may be provided, in some embodiments, in response to the NFCC 336 querying the DH 334 for the DH routing table information 338 or by storage of routing table data provided by the DH at some earlier stage of NFCC configuration. For example, in circumstances where the option bits accessed by the NFCC 326 are set to values that cause the NFCC to attempt to obtain the routing table information from at least one of the secure computing environments (after removing routing table information from configuration information sent by the DH), but such routing table information is not available at the secure computing environments, the DH may be queried again so that its routing table information is re-sent to the NFCC. Alternatively, in some implementations, the routing table information sent by the DH when it sent the configuration information may have been removed and stored, and subsequently (e.g., in response to a determination that the secure computing environments do not have routing table information) the removed and stored routing table information (or some portion thereof) may be written into the data routing tables 330 of the NFCC 326. The DH 334 may be a removable or non-removable module that includes pre-programmed or programmable information (such as the DH-based routing table information). In implementation where the DH 334 can be programmed with routing table information, the DH 334 may include a communication module (e.g., a transceiver, such as a wireless or wired-based transceiver) configured to communicate with a remote device (e.g., a remote server, such as a base station) and receive therefrom data for storage on a storage device/unit included on the DH 334.

As further shown in FIG. 3, in some variations, the communications network 300 may include a remote secure computing environment server 340. The remote secure computing environment server 340 is configured to communicate with the communications device 302 and/or provide a routing table information 342 to the communications device 302. By way of example and not limitation, the remote secure computing environment server 340 may provide secure routing table information, stored in a server routing table information 342, to the one or more secure computing environments on the communications device 302, such as, but not limited to the first and/or the second secure computing environment 318 and/or 320. In some implementations, the remote secure computing environment server 340 and/or the communication device 302 may be operable to communicate, for example, via a provisioning agent 350 (which is configured to function as a mediating module/component, and which is generally part of the device 302) and/or to communicate via some other type of communication interface. The remote secure computing environment server 340 may be operable to communicate with the communications device 302 using, for example, an access network and/or a core network (e.g., a CDMA network, a GPRS network, a UMTS network, and other types of wired and/or wireless communication networks). In some embodiments, the secure routing table information on the remote environment 340 may be written directly into, for example, the data routing table(s) 330 (e.g., when the communication device 302 seeks to obtain routing table information in accordance with the configuration/value of its location option bits).

Thus, and as will also be described in greater details below, the communications network 300 and the communications device 302 provide an efficient, optimized, and simplified procedure for providing secure or trusted data routing information to an NFC controller.

Figure 4:
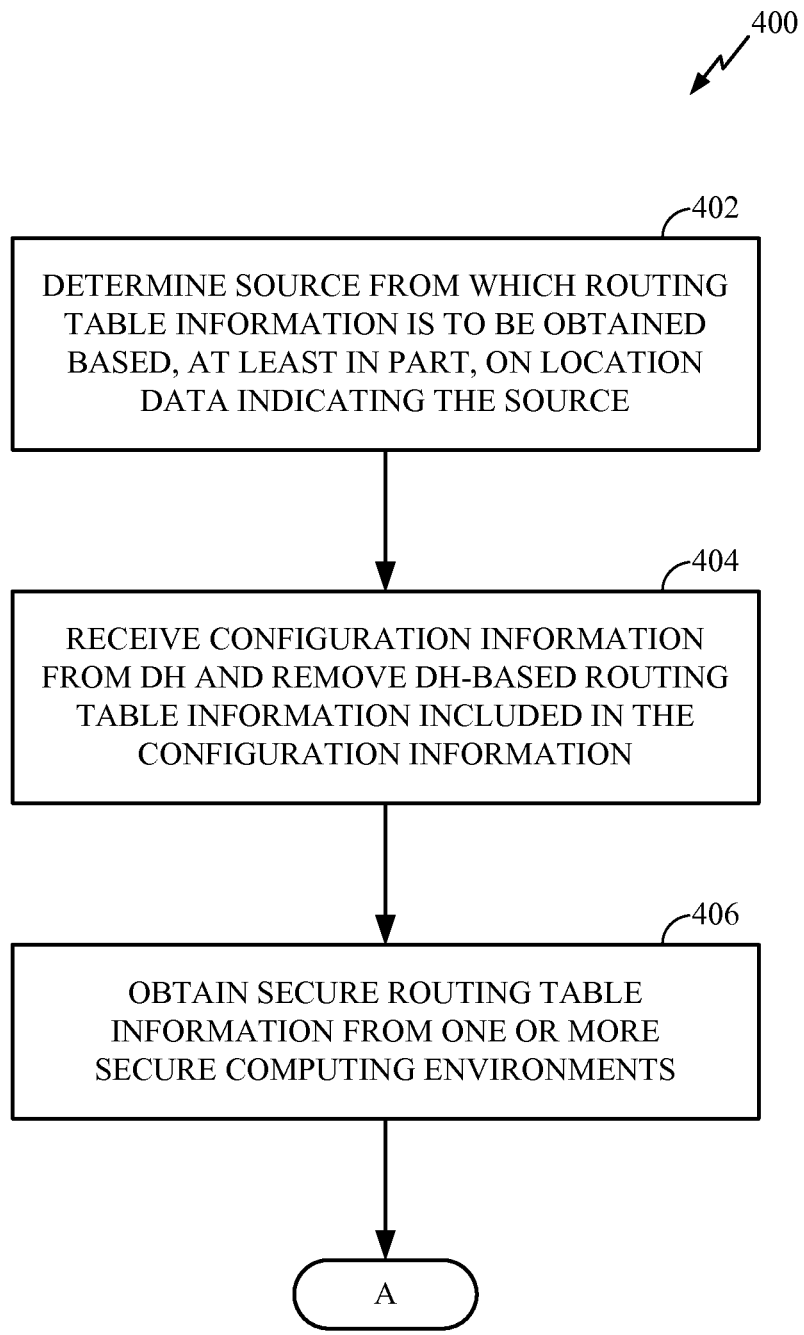
FIG. 4 is a flowchart of an example procedure for providing secure data routing table information to an NFC Controller (NFCC).
Figure 5:
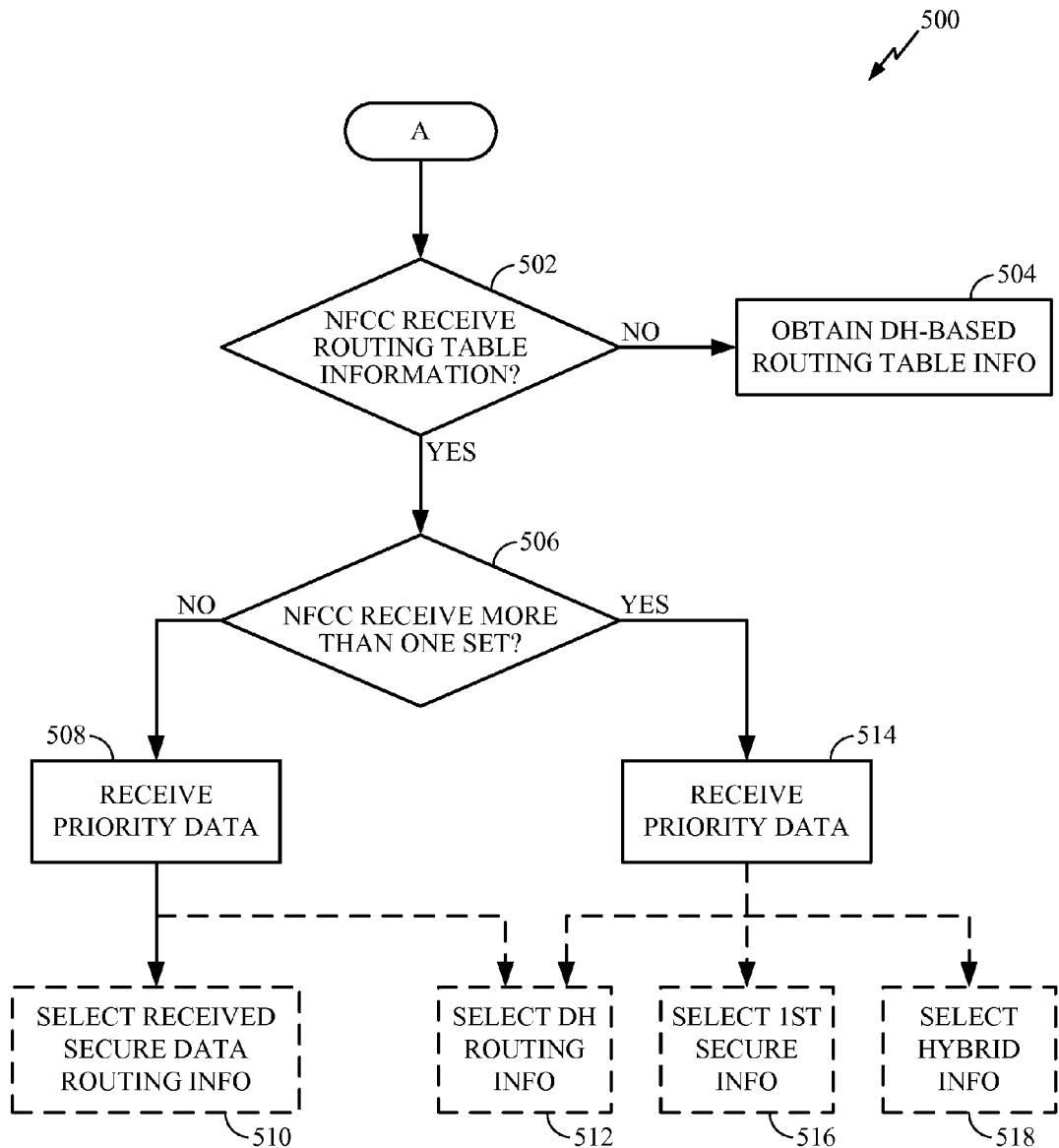
FIG. 5 is a flowchart describing additional operations for providing secure data routing table information to an NFCC.

FIGS. 4 and 5 illustrate various procedures for performing secure transfer of, for example, routing table information to NFC-based devices and systems. While, for purposes of simplicity of explanation, the procedures are shown and described as several acts or operations, it is to be noted that the implementations described herein are not limited by the order of acts/operations, as some acts/operations may occur in different orders and/or concurrently with other acts/operations from those shown and described. For example, the described procedures/methodologies could be represented as interrelated states or events, such as states/event depicted in a state diagram. Moreover, not all illustrated acts/operations may be required to implement the procedures described herein. The procedures/methodologies disclosed hereinafter and throughout this specification can be stored on an article of manufacture to facilitate and enable implementation of such procedures/methodologies on computers-based systems and devices. The terms article of manufacture or computer program product, as used herein, is intended to encompass a computer program accessible from any non-transitory computer-readable device, carrier, or media.

Thus, with reference now to FIG. 4, a flowchart of an example procedure 400 to provide secure or trusted data routing information to an NFC controller is illustrated. As shown, a determination is made 402, for example, by an NFCC (such as the NFCC 326 depicted in FIG. 3) of the source from which routing table information is to be obtained based, at least in part, on location data indicating the source. The NFCC may then obtain from that source the routing table information and write it, for example, to the data routing tables 330 of the NFCC 326. For example, the NFCC may determine that one or more routing table option bits are set to allow the NFCC to receive routing table information from at least one of the one or more secure computing environments, or from a DH (e.g., the NFCC is allowed, under this configuration, to receive routing table information from either the secure computing environments, or the DH, but the NFCC may, in some embodiments, first attempt to obtain the routing table information from the secure computing environments when the option bits are set for this particular configuration). In some variations, routing table location option bits (constituting the location data indicating the source from which routing table information is to be obtained) may be stored in a dedicated storage device (e.g., a volatile or non-volatile memory device), such as the option bits storage element 332 coupled to the data routing controller 328 of the NFC Controller 326 depicted in FIG. 3. The option bits, which may be two or more dedicated bits of a register or some other memory element of the storage device 332 may be pre-configured by a network, network provider, or manufacturer, for example, and may be stored in a non-volatile memory and be unchangeable. However, in alternative embodiments, the routing table location option bits may be stored in a volatile memory and may be later changed (e.g., post-assembly or post-manufacturing) to enable, for example, data routing information transfer from a different set of secure computing environments or other components. The option bits thus store values indicative of how the NFCC 326 (and by extension the device 302) is to obtain routing table information. For example, assume that there are two (2) routing table location option bits on the storage element 332, which can thus indicate four (4) different data routing options/modes for the NFCC 326 and/or the device 302. Setting the option bits to a value of, for example, '0' and '1', respectively, may indicate that routing table information may not, under any condition, be downloaded from the DH (which is vulnerable to data manipulation attacks), and that the routing table information is to be obtained from secure computing environments (such as the environments 318 and/or 320 shown in FIG. 3). On the other hand, setting the option bits to values of, for example, '1' and '0' may be used to indicate that routing table data should be obtained from the secure computing environments, but in the event that the secure computing environment do not have at least some of the required routing table information stored therein, the NFCC may, in that case, obtain the routing table information from the DH. Thus, to determine the routing table information location mode to be used, the NFCC may access the storage element 332 and read the content of the bits corresponding to the option bits indicative of where the routing table information is to be obtained from. In some embodiments, a pattern of '00' set in the option bits may be used to indicate, for example, that the controller supports only routing data from the DH, and a pattern of '11' set in the option bits may be used to indicate, for example, that the NFCC does not support modifiable routing tables. In some implementations, the various values of the option bits may be used to indicate other types of modes or states, and/or to cause different actions/operations that are based on those option bits' values.

Figure 7:
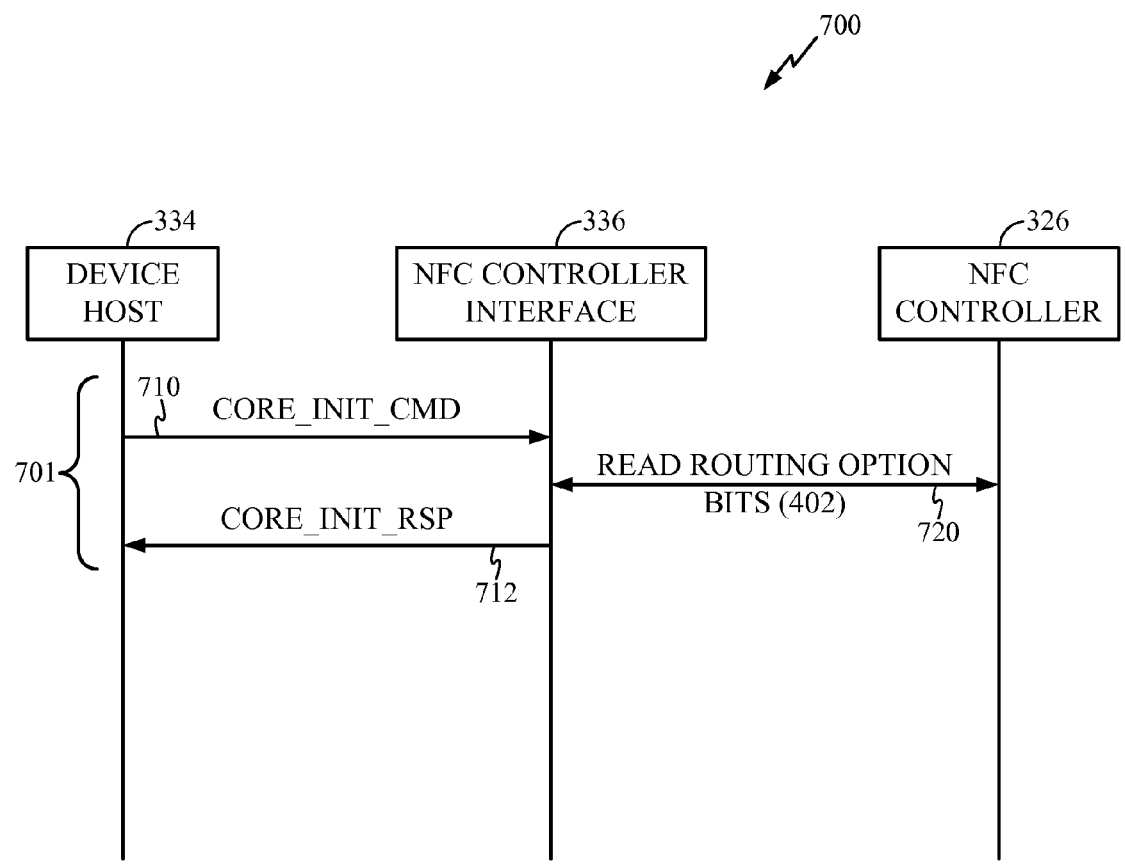
FIG. 7 is a flow diagram of a communication exchange between a device host, an NFC Controller Interface, and an NFC Controller of a communication device.

In some variations, the NFCC 326 may implement an NCI communications protocol between the NFC Controller Interface 336 and the device host 334. With reference to FIG. 7, showing a flow diagram of a communication exchange 700 between a device host (such as DH 334 of FIG. 3) and an NFCI (such as the NFCI 336 of FIG. 3) of the communication device, the NFC Controller 326 may be initialized through a CORE_INIT_CMD and CORE_INIT_RSP message sequence 701. Particularly, in response to receipt of a CORE_INIT_CMD message 710 from the device host, the NFC controller interface 336 configures a response message, such as a CORE_INIT_RSP message 712, so that the response message includes data indicating the routing table location source/mode that is to be used. For example, the interface 336 may access and read the storage element 332 storing the routing option bits (illustrated in FIG. 7 as operation 720), and then set appropriate bits (e.g. bits 4 and 5 or 6 and 7) of the 'NFCC Feature Octets 1 and 2' bits in the of the CORE_INIT_RSP message 714 to the values of the option bits on the storage element 332. The 'NFCC Feature Octet 1' contains bits that have been reserved to indicate the routing table option/mode to be employed by the NFCC and/or the communication device (e.g., the communication device 302 of FIG. 3) thus indicating how the NFCC will behave when there are multiple sources of routing table information available to it. If, for example, the two routing option bits stored on the storage element 332 are set to a value of '0' and '1', these values are written to the 'NFCC Feature Octet 1' to indicate that the NFCC will attempt to receive routing table information from one or more secure computing environments or from the DH.

With continued reference to FIG. 4, the configuration information is received 404 at the NFCC from the DH (e.g., in response to the DH receiving the CORE_INIT_RSP, the DH sends the configuration information). In response to a determination that the routing option bits are set to indicate that the NFCC may attempt to receive routing table information from one or more secure computing environments or from the DH, routing table information included in the configuration information sent from the DH is removed, as also shown at 404 of FIG. 4. For example, removing the routing table information may be performed by identifying the portion of the configuration information that has the DH routing table information, and processing the identified portion and/or the other portion of the configuration information (truncating or cutting the routing table information from the rest of the configuration information). In some variations, removing the routing table information from the received configuration information may include, for example, discarding the routing table information so that the removed data is no longer available to the NFCC. As data routing information located in the DH is susceptible to hacking and/or alteration by an untrusted source, discarding such information may minimize the possibility of data routing corruption once such information is loaded and utilized at the NFCC. If it is subsequently determined that the removed and discarded data is required by the NFCC (e.g., if routing table data cannot be obtained from secure computing systems), the NFCC would need to access again the DH (e.g., via the NFCI 336) and have the routing table data communicated to it from the DH. In some variations, removing the routing table information from the received configuration information may include, for example, storing the removed routing table data for future use on a local storage device (e.g., one coupled to the NFCI and/or the NFCC). If the secure computing environments are determined to not have the secure routing table information, the routing table information that was removed from the configuration data sent from the DH to the NFCI is retrieved from the storage device where that removed routing table information was stored, thus avoiding having to query the DH to again have it send the routing table information to the DH.

As further shown in FIG. 4, secure routing table information is obtained 406 from at least one of these secure computing environments. In some embodiments, obtaining the secure routing table information includes, for example, accessing the one or more secure computing environments and querying the one or more secure computing environments to determine if the secure computing environments include the routing table information required by the NFCC, or at least a portion of the routing table information. If the secure computing environments include the secure routing table information, or some portion thereof, the secure routing table information may be communicated over an interface, such as the NCI. This secure routing table information may be configured by a trusted source, such as a network provider, manufacturer, or device provider, and use of this trusted data routing information by the NFCC can increase the likelihood that corrupted data routing procedures are not initiated by the NFCC.

In another example, consider a situation in which a DH and an NFCC are connected over the NCI (NFC controller interface) and the configuration element is set to indicate that the routing table should be provisioned from a secure element (SE). A CORE_INIT_RSP message may be passed by the NFCC to the DH, and the NFCC may set the NFCC Features Octet 1 bits 6 and 7 to a value of '1' and '0', respectively, indicating that the NFCC may receive configuration from DH and/or other NFCEEs. The NFCC may ignore the content of RF_SET_LISTEN_MODE_ROUTING_CMD messages, although may return STATUS_OK in the associated response. When the NFCC has completed its basic start-up sequence (i.e. has sent CORE_INIT_RSP to the DH), the NFCC may attempt to SELECT the NCI routing configuration application in the SE. If the SELECT operation succeeds, the NFCC performs a READ BINARY operation to fetch routing data. In some embodiments, the data could be encoded in a form which straightforwardly decodes to NCI RF_SET_LISTEN_MODE_ROUTING_CMD messages. This operation is repeated until the complete routing table has been obtained.

Turning to FIG. 5, a flowchart of a further example procedure 500 to provide secure or trusted data routing information to an NFCC is shown. The procedure 500 may be a continuation of the procedure 400, as indicated by linking point A. Alternatively, the procedure 500 may be an independent, stand-alone process. As illustrated, the NFCC determines 502 whether in response to an attempt to obtain (e.g., query) data routing table information from at least one of the one or more secure computing environments (as performed at 406 of FIG. 4), routing table information was in fact obtained. Where there has been a failure to obtain secure routing table information (as determined at 502), the NFCC may obtain 504 DH-based routing table information. For example, in some implementations, the NFCC may access/query (e.g., by sending a request) the DH so the DH can again provide its routing table to the NFCC. Alternatively and/or additionally, in some implementations, the NFCC may retrieve from a local storage device the routing information which was previously removed from the configuration information provided by the DH (e.g., as was done at 404) and stored.

On the other hand, where the NFCC receives secure routing information, this information may include, for example, one set of secure routing table information or more than one set of secure routing table information, depending on the number of secure computing environments available to the NFCC and/or the number of secure computing environments accessed and/or queried. If it is determined (at 506) that a single set of secure routing table information has been received from a transmitting secure computing environment, the NFCC may determine 508 whether secure routing table information priority data has been received. Such secure routing table information priority data may indicate to the NFCC whether the secure routing information received from the respective transmitting secure computing environment(s) should be utilized by the NFCC, or whether the NFCC should utilize data routing information located in the DH. A determination as to how priority data is to be used in selecting the data routing information may be based, in some implementations, on priority data policies and/or rules specifying how the prioritization will be used. Such priority data policies/rules may be programmable and/or modifiable by authorized users, authorized entities, and/or authorized machines. An example of policies/rules based on which routing data information is selected (e.g., from the secure computing environments or from the DH) may include a policy/rule that if the priority data indicates that the DH data is at least N days (where N is some predetermined number representative of days) more recent than the secure environment data, the DH routing data should be used. Conversely, in this example, if the data routing information from the DH is fewer than N days more recent than the data in the secure environment, the data in the secure environment should be used.

Where the priority data (and/or priority rule/policies) are such that a determination is made that the secure routing information from the transmitting secure computing environment should be utilized, the NFCC may select this secure routing table information and load/write it 510 to its one or more data routing tables (e.g., the tables 330 depicted in FIG. 3). On the other hand, where the secure routing table information priority data indicates that DH data routing information should be used, the NFCC may obtain DH-based routing table information. For example, the NFCC may query/request or access the DH to obtain from the DH routing table information (e.g., in response to a request from the NFCC, the DH may communicate its routing table information to the NFCC). Alternatively, the NFCC may retrieve routing table information removed and stored from configuration information previously sent by the DH (e.g., as performed in the operations 404 of the procedure 400). The DH-based data may then be loaded/written 512 into the NFCC's one or more data routing tables.

On the other hand, consider a situation where the NFCC determines (at 506) that it has received more than one set of routing table information. For example, the NFCC may receive a first set of routing table information associated with a first secure computing environment and a second set of routing table information associated with a second secure computing environment (it is to be noted that more than two secure computing environments, providing more than two sets of routing table information to the NFCC, may exist). The NFCC may determine 514 whether secure routing table information priority data has likewise been received along with the one or more sets of routing table information. This secure routing table information priority data may indicate to the NFCC whether a particular set of routing information received from a respective transmitting secure computing environment should be utilized by the NFCC or whether the NFCC should utilize data routing information located in the DH. Here too, similar to the priority-based determination described in relation to the operations 508, 510 and 512 of FIG. 5, a determination of which data routing information should be used may be based on programmable/modifiable priority data rules/policies that are controlled by an authorized user, entity, and/or machine. Thus, where the priority data and/or priority data rules/policies indicate that the secure routing information from the first secure computing environment should be utilized, the NFCC may select this secure routing table information and load/write it 516 to its one or more data routing tables (e.g., into the tables 330 depicted in FIG. 3). In some implementations, a determination may be made (e.g., based on priority information) that the secure routing table information from the second secure computing environment should be used. Where the secure routing table information priority data indicates that DH data routing information should be used, the NFCC may determine that DH-based routing table information should be obtained, and may query or access the DH for this information, receive the information, and load/write it 512 to the NFCC's one or more data routing tables. As noted herein, in some embodiments, information previously removed from configuration information transmitted by the DH may be retrieved (e.g., from storage device accessible by the NFCC) and loaded/written to the NFCC's one or more routing tables.

Where the priority information does not indicate which set of routing table information should be utilized, or indicates that more than one set may be utilized, the NFCC may select both the first set of the routing table information and the second set of the routing table information that are respectively associated with the first and second secure computing environments. From these multiple sets of secure routing table information, the NFCC may assemble a hybrid secure routing table information set and may select and load 518 this hybrid set to its data routing table.

Figure 8:
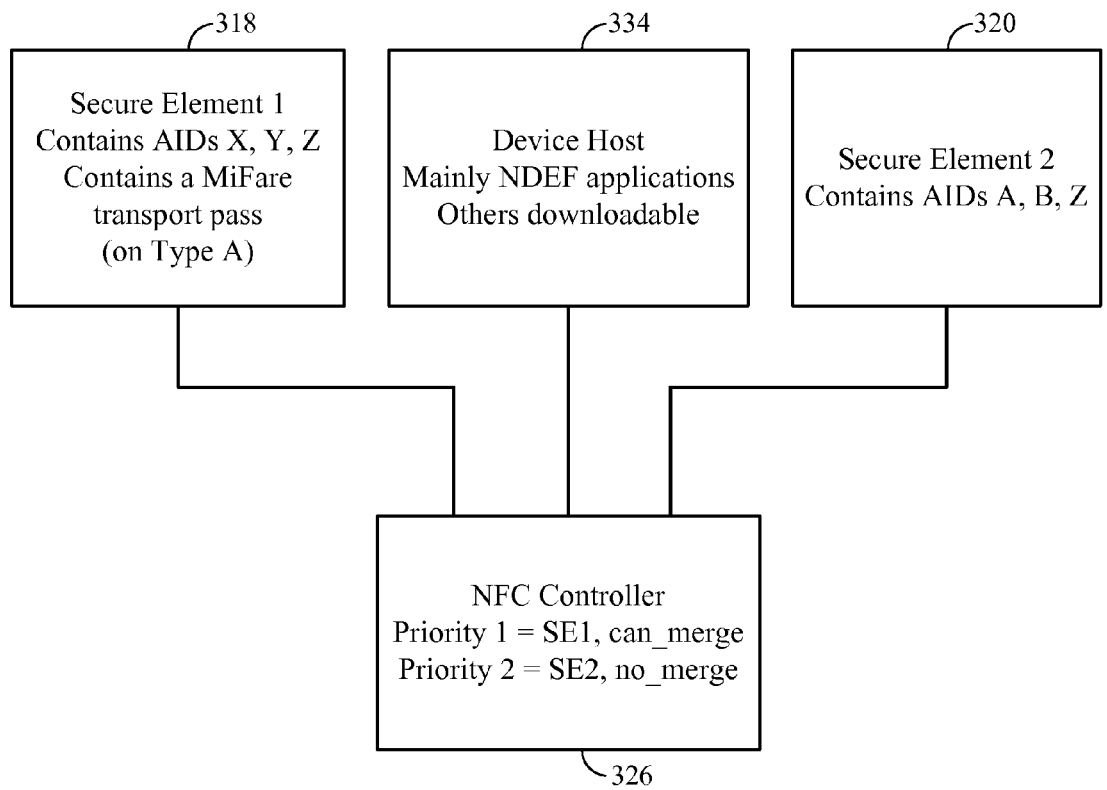
FIG. 8 is a block diagram of a part of the NFC environment of FIG. 3.

To illustrate generation/assembly of hybrid routing table information, consider an example in FIG. 8, showing a block diagram of a part of the NFC environment 300 depicted in FIG. 3, and the interconnections between the modules shown. In particular, FIG. 8 depicts the secure elements 318 and 320 of FIG. 3 coupled to the NFC controller 326, with the NFCC 326 further coupled to the DH 334 of FIG. 3. Also illustrated in FIG. 8 are the data routing information and priority information that is available. As shown in the example of FIG. 8, the NFC Controller 326 includes priority information indicating that the first priority for routing table has been assigned to Secure Element 1 (318), with an indication of 'can_merge', indicating that further routing tables can be merged if they exist. The secure Element 318 contains three applications with unique identifiers (AID) X, Y and Z. It further contains, in this particular example, a MiFare transport ticketing application using Type A RF technology. In some implementations, the routing table information may include information such as the following (including configuration for multiple power states):

```
RF_SET_LISTEN_MODE_ROUTING_CMD
    More = 0x00
    Number of routing entries = 8
    Routing Entry 1: Type = 0x00, Length = 3,
        Value: NFCEE ID = 1, Power State = Off, Technology = 0x00
    Routing Entry 2: Type = 0x02, Length = <AID length + 2>
        Value: NFCEE ID = 1, Power State = Off, AID = X
    Routing Entry 3: Type = 0x02, Length = <AID length + 2>
        Value: NFCEE ID = 1, Power State = Off, AID = Y
    Routing Entry 4: Type = 0x02, Length = <AID length + 2>
        Value: NFCEE ID = 1, Power State = Off, AID = Z
    Routing Entry 5: Type = 0x00, Length = 3,
        Value: NFCEE ID = 1, Power State = On, Technology = 0x00
    Routing Entry 6: Type = 0x02, Length = <AID length + 2>
        Value: NFCEE ID = 1, Power State = On, AID = X
    Routing Entry 7: Type = 0x02, Length = <AID length + 2>
        Value: NFCEE ID = 1, Power State = On, AID = Y
    Routing Entry 8: Type = 0x02, Length = <AID length + 2>
        Value: NFCEE ID = 1, Power State = On, AID = Z
```

The secure element 320 contains, in this particular example, three applications with unique identifiers (AID) A, B and Z. Thus, in this example, the last AID for the secure element 320 is the same as an AID in the first secure element 318. The routing table corresponding to the second secure element 320 may include, for example:

```
RF_SET_LISTEN_MODE_ROUTING_CMD
    More = 0x00
    Number of routing entries = 6
    Routing Entry 1: Type = 0x02, Length = <AID length + 2>
        Value: NFCEE ID = 2, Power State = Off, AID = A
```

```
    Routing Entry 2: Type = 0x02, Length = <AID length + 2>
        Value: NFCEE ID = 2, Power State = Off, AID = B
    Routing Entry 3: Type = 0x02, Length = <AID length + 2>
        Value: NFCEE ID = 2, Power State = Off, AID = Z
    Routing Entry 4: Type = 0x02, Length = <AID length + 2>
        Value: NFCEE ID = 2, Power State = On, AID = A
    Routing Entry 5: Type = 0x02, Length = <AID length + 2>
        Value: NFCEE ID = 2, Power State = On, AID = B
    Routing Entry 6: Type = 0x02, Length = <AID length + 2>
        Value: NFCEE ID = 2, Power State = On, AID = Z
```

When the NFC Controller 326 begins to configure its routing table, it searches for the sources of routing table information (as performed, for example, at 402 of FIG. 4). The NFCC may determine that it should look in the first priority in the secure element 318, and that it should then merge (in accordance with the 'can_merge' indicator/flag) the routing data found in 318 with the second priority device, which is the secure element 320, and can then stop searching for routing tables.

The hybrid routing table is constructed by first constructing a routing table containing routing entries from the first priority location and then adding entries from the second (and other sources/locations, if allowed) provided that they are not in conflict with higher priority configurations (e.g., provided that the routing table information from the other sources/location do not overwrite an entry which is already present). In the example above, AID Z is present in both the secure elements 318 and 320, and since the secure element 318 has priority, in this example, over other sources/locations, the AID Z associated with the secure element 320 is not included in the hybrid table. AIDs A and B in the secure element 320 are, on the other hand, not in conflict with the AIDs of the secure element 318, and are therefore included in the hybrid table.

Thus, after merging the routing table information from the secure elements 318 and 320, the overall routing table in this example may be as follows:

```
RF_SET_LISTEN_MODE_ROUTING_CMD
    More = 0x00
    Number of routing entries = 12
    Routing Entry 1: Type = 0x00, Length = 3,
        Value: NFCEE ID = 1, Power State = Off, Technology = 0x00
    Routing Entry 2: Type = 0x02, Length = <AID length + 2>
        Value: NFCEE ID = 1, Power State = Off, AID = X
    Routing Entry 3: Type = 0x02, Length = <AID length + 2>
        Value: NFCEE ID = 1, Power State = Off, AID = Y
    Routing Entry 4: Type = 0x02, Length = <AID length + 2>
        Value: NFCEE ID = 1, Power State = Off, AID = Z
    Routing Entry 5: Type = 0x00, Length = 3,
        Value: NFCEE ID = 1, Power State = On, Technology = 0x00
    Routing Entry 6: Type = 0x02, Length = <AID length + 2>
        Value: NFCEE ID = 1, Power State = On, AID = X
    Routing Entry 7: Type = 0x02, Length = <AID length + 2>
        Value: NFCEE ID = 1, Power State = On, AID = Y
    Routing Entry 8: Type = 0x02, Length = <AID length + 2>
        Value: NFCEE ID = 1, Power State = On, AID = Z
    Routing Entry 9: Type = 0x02, Length = <AID length + 2>
        Value: NFCEE ID = 2, Power State = Off, AID = A
    Routing Entry 10: Type = 0x02, Length = <AID length + 2>
        Value: NFCEE ID = 2, Power State = Off, AID = B
    Routing Entry 11: Type = 0x02, Length = <AID length + 2>
        Value: NFCEE ID = 2, Power State = On, AID = A
    Routing Entry 12: Type = 0x02, Length = <AID length + 2>
        Value: NFCEE ID = 2, Power State = On, AID = B
```

Figure 6:
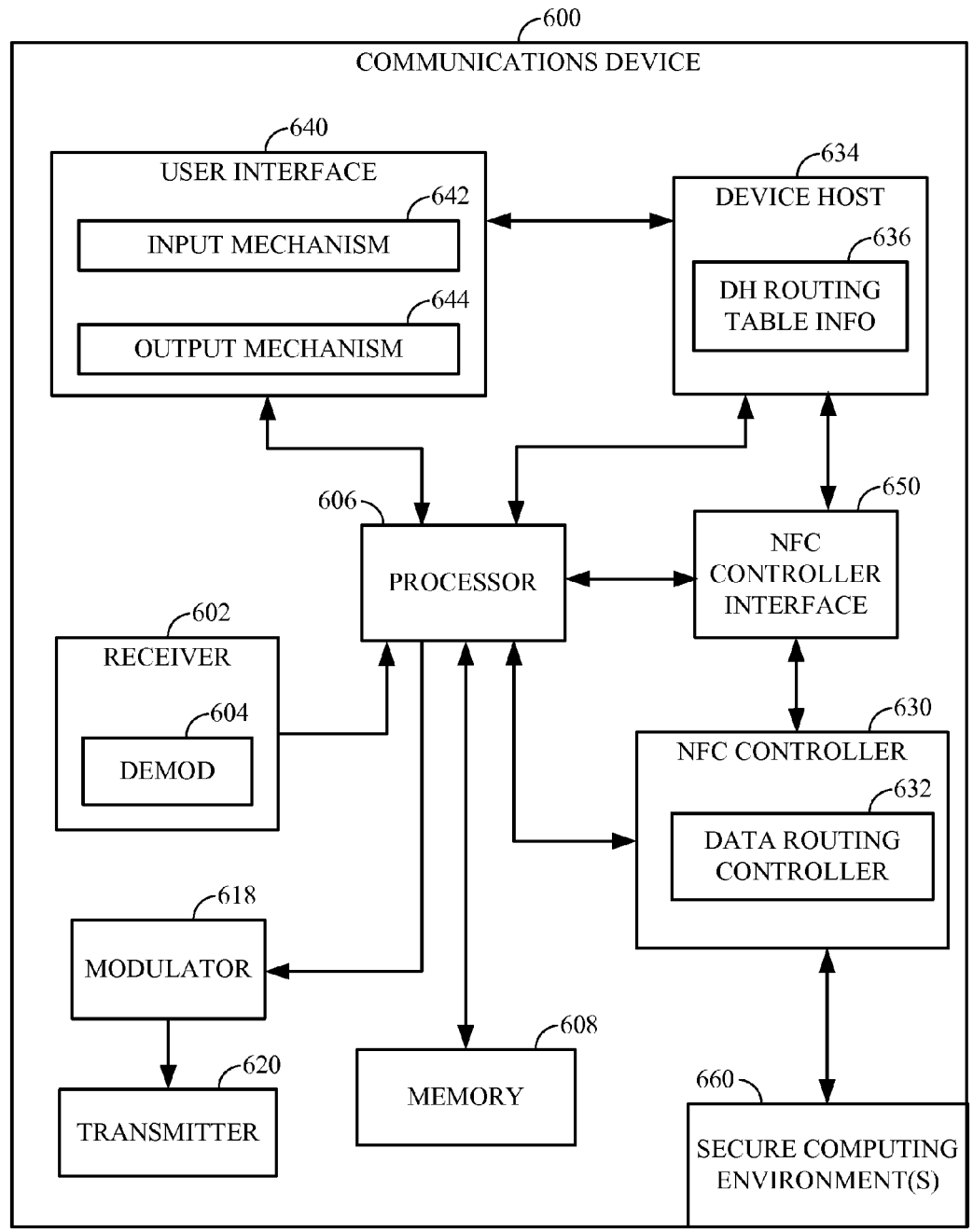
FIG. 6 is a schematic block diagram of an example architecture of a communications device.

With reference now to FIG. 6, and with further reference to FIG. 3, an example architecture of a communications device 600 (corresponding to an implementation of, for example, the communication device 302 of FIG. 3) is illustrated. As depicted in FIG. 6, the communications device 600 includes a receiver 602 to receive a signal from, for instance, a receive antenna (not shown), perform typical standard actions/operations (e.g., filtering, amplifying, down-converting, etc.) on the received signal (alternatively, a processing module coupled to the receiver may perform at least some of these standard actions/operations). In some embodiments, the receiver, or a processing module coupled thereto, may also digitize the conditioned signal to obtain samples. The receiver 602 may include a demodulator 604 to demodulate received symbols and provide them to a processor 606 to perform, for example, channel estimation. The processor 606 can be a processor dedicated to analyze information received by the receiver 602 and/or to generate information for transmission by a transmitter 620, a processor to control one or more components of the device 600, and/or a processor configured to analyze information received by the receiver 602, generate information for transmission by the transmitter 620, and control one or more components of the communications device 600. Furthermore, signals may be prepared for transmission by the transmitter 620 through a modulator 618 which may modulate the signals processed by the processor 606.

The communications device 600 can additionally include a memory 608 that is operatively coupled to the processor 606 and that can store data to be transmitted, received data, information related to available channels, TCP flows, data associated with analyzed signal and/or interference strength, information related to an assigned channel, power, rate, or the like, and/or any other suitable information to facilitate communication operations. The memory 608 (also referred to as data store) described herein can be realized through, for example, volatile memory or non-volatile memory, and/or can include both volatile and non-volatile memory. By way of illustration, and not limitation, non-volatile memory can include read only memory (ROM), programmable ROM (PROM), electrically programmable ROM (EPROM), electrically erasable PROM (EEPROM), or flash memory. Volatile memory can include random access memory (RAM), which may act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems, apparatus, methods, and other implementations may include, without being limited to, these and any other suitable types of memory.

Additionally, the processor 606 and/or a device host 634 (which may be similar to the device host 334 depicted in FIG. 3) can implement a procedure to provide DH routing table information 636 (i.e., DH-based routing table information stored at the DH 634) to an NFC controller (NFCC) 630 (which may be similar in configuration and functionality to the NFCC 326 of the communication device 302 of FIG. 3) and/or a data routing controller 632 (which may be similar to the data routing controller 328 shown in FIG. 3) located therein. Furthermore, the NFCC 630 and/or the processor 606 may be configured to obtain from the device host 634 DH routing table information 636 (e.g., by, for example, querying the DH 634 and receiving in response the DH routing table information stored at the DH 634).

In some variations, the communication device 600 may also include an NFC controller interface (NCI) 650 (which may be similar to the NCI 336 described in relation to FIG. 3). In some embodiments, the NCI 650 may be operable to enable communications between a NFC enabled communication module (e.g., the receiver 602 and/or the transmitter 620) and the NFC controller 630. NCI 650 may be configurable to function in a listening mode and/or a polling mode.

As described herein, in some embodiments, the communications device 600 may include one or more secure computing environments 660, which may be similar to the secure computing environments 318 and 320 described in relation to FIG. 3. The one or more secure computing environments 660 may be coupled to the NFC controller 630. Further, the one or more secure computing environments 660 may include one or more applications configured to request access to various modules and/or functionalities available through the NFC controller 630. The one or more secure computing environments 660 may be secure elements or near field controller execution environments (NFCEEs). In some implementations, the one or more secure computing environments 660 may include a UICC with various modules such as, but not limited to, a SIM, a CSIM, etc. In some implementations, the one or more secure computing environments 660 may be assigned an index as a secure computing environment identifier and may be operable to use settings indicated through a configuration parameter that may be used during the secure data routing information loading and utilization processes, as described with respect to, for example, FIGS. 4 and 5.

As noted, the NFC controller, such as the NFC controller 630 of FIG. 6, may include a data routing controller 632. This data routing controller 632 may be configured to obtain from (based on values indicated by one or more routing table location option bits located, for example, at the data routing controller 632) the one or more secure computing environments 660 and/or the device host 634, data routing information for use in subsequent data routing procedures performed by the NFCC 630. As noted with respect to the communication device 302 shown in FIG. 3, the data routing controller may also include storage to store data routing tables with routing table information received from the one or more secure computing environments (the secure computing environments 660 in the example of FIG. 6) and/or the DH (the DH 634 in the example of FIG. 6).

The communications device 600 may further include a user interface 640. The user interface 640 may include input mechanism/module 642 for providing inputs to the communications device 600, and an output mechanism/module 644 for generating information presentable to the user of the communications device 600. For example, the input mechanism 642 may include a mechanism such as a key or keyboard, a mouse, a touch-screen display, a microphone, etc. The output mechanism 644 may include, for example, a display, an audio speaker, a haptic feedback mechanism, a Personal Area Network (PAN) transceiver, etc. In the illustrated examples, the output mechanism 644 may include a display operable to present media content that is in image or video format and/or an audio speaker to present media content that is in an audio format.

As used in this application, the terms "component," "module," "system" and the like are intended to include a computer-related entity, such as, but not limited to, hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various non-transitory computer readable media with various data structures stored thereon. The components may communicate by way of local and/or remote processes using signals with, for example, one or more data packets to communicate data from one component interacting with another component in a local system, distributed system, and/or across a network (such as the Internet).

Furthermore, various embodiments described herein in connection with a terminal can include a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

The techniques and implementations described herein may be used for various wireless communication systems such as CDMA, TDMA, FDMA, OFDMA, SC-FDMA and other systems. The terms "system" and "network" are sometimes used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC-F, etc.), other communication system implementations based on RFID technologies and protocols, and any other short- or long-range, wireless communication techniques.

Various embodiments and features are presented in terms of systems that may include a number of devices, components, modules, and the like. The various systems may include additional devices, components, modules, etc. and/or may not include all of the devices, components, modules, etc., discussed in connection with the figures. A combination of these approaches may also be used.

The various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the operations, steps, functions, and/or actions of a method, procedure, or technique described in connection with the implementations disclosed herein may be embodied or implemented in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium. An example storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user terminal. In the alternative, the processor and the storage medium may reside as discrete components in a user terminal. Additionally, in some variations, the operations, steps, functions, and/or actions of a method, technique, or procedure may reside as one or any combination or set of codes and/or instructions on a machine readable medium and/or computer readable medium, which may be incorporated into a computer program product.

If implemented in software, the functions may be stored or transmitted as one or more instructions or code on a non-transitory computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative examples and/or implementations, it should be noted that various changes and modifications could be made herein without departing from the scope of the described examples and/or implementations as defined by the appended claims. Furthermore, although elements of the described examples and/or implementations may be described or claimed in the singular, the plural is contemplated unless limitation to the singular is explicitly stated. Additionally, all or a portion of any example and/or implementation may be utilized with all or a portion of any other example and/or implementation, unless stated otherwise.

What is claimed is:

1. A method comprising:
   determining a source from which routing table information is to be obtained based, at least in part, on location data indicating the source;
   receiving configuration information from a device host (DH); and
   in response to the location data indicating that a near-field communication controller (NFCC) is configured to receive the routing table information from one or more secure computing environments or from the DH:
      removing DH-based routing table information included in the configuration information so that routing table information, different from the DH-based routing table information, from a secured source can be loaded into one or more data routing tables of the NFCC, and
      obtaining secure routing table information from at least one of the one or more secure computing environments to be loaded into the one or more data routing tables of the NFCC.

2. The method of claim 1, wherein determining the source comprises:
   determining that one or more routing table location option bits are set to allow the NFCC to receive the routing table information from the one or more secure computing environments or from the DH.

3. The method of claim 2, wherein the one or more routing table location option bits are unchangeable and stored on a non-volatile memory.

4. The method of claim 2, wherein the one or more routing table location option bits are changeable.

5. The method of claim 1, wherein removing the DH-based routing table information included in the received configuration information comprises one of:
   discarding the DH-based routing table information included in the configuration information received from the DH; and
   storing the DH-based routing table information included in the configuration information received from the DH.

6. The method of claim 1, further comprising:
   in response to a determination of failure to obtain the secure routing table information from the at least one of the one or more secure computing environments, obtaining the DH-based routing table information, wherein obtaining the DH-based table information comprises one of:
   obtaining the DH-based routing table information stored at the DH, and
   obtaining the removed routing table information from a storage device coupled to the NFCC, the storage device storing the removed DH-based routing table information after the removal of the DH-based routing table information from the configuration information received from the DH.

7. The method of claim 1, wherein the one or more secure computing environments include a first secure computing environment and a second secure computing environment, and wherein the method further comprises:
- receiving first routing table information associated with the first secure computing environment and second routing table information associated with the second secure computing environment, and
- selecting the first routing table information.

8. The method of claim 7, further comprising:
- selecting the first routing table information and the second routing table information; and
- combining the first routing table information and the second routing table information to produce a hybrid routing table.

9. The method of claim 1, further comprising:
- receiving secure routing table information priority data associated with the one or more secure computing environments; and
- determining based on the received secure routing table information priority data whether to utilize the secure routing table information obtained from the at least one of the one or more secure computing environments or to obtain the DH-based routing table information from the DH.

10. The method of claim 1, wherein the at least one of the one or more secure computing environments is selected from the group consisting of a secure element, a virtual secure element, an NFC execution environment, a smart card, a universal integrated circuit card, a subscriber identity module, an SD Card containing the secure computing environment, and a Universal Serial Bus (USB)-based device containing the secure computing environment.

11. The method of claim 1, wherein the one or more secure computing environments are removable.

12. The method of claim 1, wherein the one or more secure computing environments are fixed.

13. An apparatus for wireless communication, comprising:
means for determining a source from which routing table information is to be obtained based, at least in part, on location data indicating the source;
- means for receiving configuration information from a device host (DH); and
- means for performing in response to the location data indicating that a near-field communication controller (NFCC) is configured to receive the routing table information from one or more secure computing environments or from the DH:
- removing DH-based routing table information included in the configuration information so that routing table information, different from the DH-based routing table information, from a secured source can be loaded into one or more data routing tables of the NFCC, and
- obtaining secure routing table information from at least one of the one or more secure computing environments to be loaded into the one or more data routing tables of the NFCC.

14. The apparatus of claim 13, wherein the means for determining the source comprise:
- means for determining that one or more routing table location option bits are set to allow the NFCC to receive the routing table information from the one or more secure computing environments or from the DH.

15. The apparatus of claim 14, wherein the one or more routing table location option bits are unchangeable and stored on a non-volatile memory.

16. The apparatus of claim 14, wherein the one or more routing table location option bits are changeable.

17. The apparatus of claim 13, wherein the means for removing the DH-based routing table information included in the received configuration information comprise one of:
- means for discarding the DH-based routing table information included in the configuration information received from the DH; and
- means for storing the DH-based routing table information included in the configuration information received from the DH.

18. The apparatus of claim 13, further comprising:
- means for obtaining the DH-based routing table information in response to a determination of failure to obtain the secure routing table information from the at least one of the one or more secure computing environments, wherein the means for obtaining the DH-based table information comprise one of:
- means for obtaining the DH-based routing table information stored at the DH, and
- means for obtaining the removed routing table information from a storage device coupled to the NFCC, the storage device storing the removed DH-based routing table information after the removal of the DH-based routing table information from the configuration information received from the DH.

19. The apparatus of claim 13, wherein the one or more secure computing environments include a first secure computing environment and a second secure computing environment, and wherein the apparatus further comprises:
- means for receiving first routing table information associated with the first secure computing environment and second routing table information associated with the second secure computing environment, and
- means for selecting the first routing table information.

20. The apparatus of claim 19, further comprising:
- means for selecting the first routing table information and the second routing table information; and
- means for combining the first routing table information and the second routing table information to produce a hybrid routing table.

21. The apparatus of claim 13, further comprising:
- means for receiving secure routing table information priority data associated with the one or more secure computing environments; and
- means for determining based on the received secure routing table information priority data whether to utilize the secure routing table information obtained from the at least one of the one or more secure computing environments or to obtain the DH-based routing table information from the DH.

22. The apparatus of claim 13, wherein the at least one of the one or more secure computing environments is selected from the group consisting of a secure element, a virtual secure element, an NFC execution environment, a smart card, a universal integrated circuit card, a subscriber identity module, an SD Card containing the secure computing environment, and a Universal Serial Bus (USB)-based device containing the secure computing environment.

23. The apparatus of claim 13, wherein the one or more secure computing environments are removable.

24. The apparatus of claim 13, wherein the one or more secure computing environments are fixed.

25. A computer program product, comprising: a non-transitory computer-readable medium comprising code for:

determining a source from which routing table information is to be obtained based, at least in part, on location data indicating the source;

receiving configuration information from a device host (DH); and in response to the location data indicating that a near-field communication controller (NFCC) is configured to receive the routing table information from one or more secure computing environments or from the DH;

removing DH-based routing table information included in the configuration information so that routing table information, different from the DH-based routing table information, from a secured source can be loaded into one or more data routing tables of the NFCC, and obtaining secure routing table information from at least one of the one or more secure computing environments to be loaded into the one or more data routing tables of the NFCC.

26. The computer program product of claim 25, wherein the code for determining the source comprises code for:

determining that one or more routing table location option bits are set to allow the NFCC to receive the routing table information from the one or more secure computing environments or from the DH.

27. The computer program product of claim 26, wherein the one or more routing table location option bits are unchangeable and stored on a non-volatile memory.

28. The computer program product of claim 26, wherein the one or more routing table location option bits are changeable.

29. The computer program product of claim 25, wherein the code for removing the DH-based routing table information included in the received configuration information comprises code for one of:

discarding the DH-based routing table information included in the configuration information received from the DH; and storing the DH-based routing table information included in the configuration information received from the DH.

30. The computer program product of claim 25, further comprising code for:

obtaining the DH-based routing table information in response to a determination of failure to obtain the secure routing table information from the at least one of the one or more secure computing environments, wherein obtaining the DH-based table information comprises one of:

obtaining the DH-based routing table information stored at the DH, and obtaining the removed routing table information from a storage device coupled to the NFCC, the storage device storing the removed DH-based routing table information after the removal of the DH-based routing table information from the configuration information received from the DH.

31. The computer program product of claim 25, wherein the one or more secure computing environments include a first secure computing environment and a second secure computing environment, and wherein the code further comprises code for:

receiving first routing table information associated with the first secure computing environment and second routing table information associated with the second secure computing environment, and selecting the first routing table information.

32. The computer program product of claim 31, further comprising code for:

selecting the first routing table information and the second routing table information; and combining the first routing table information and the second routing table information to produce a hybrid routing table.

33. The computer program product of claim 25, further comprising code for:

receiving secure routing table information priority data associated with the one or more secure computing environments; and determining based on the received secure routing table information priority data whether to utilize the secure routing table information obtained from the at least one of the one or more secure computing environments or to obtain the DH-based routing table information from the DH.

34. The computer program product of claim 25, wherein the at least one of the one or more secure computing environments is selected from the group consisting of a secure element, a virtual secure element, an NFC execution environment, a smart card, a universal integrated circuit card, a subscriber identity module, an SD Card containing the secure computing environment, and a Universal Serial Bus (USB)-based device containing the secure computing environment.

35. The computer program product of claim 25, wherein the one or more secure computing environments are removable.

36. The computer program product of claim 25, wherein the one or more secure computing environments are fixed.

37. An apparatus for wireless communication, comprising:
at least one processor; and
a memory coupled to the at least one processor, wherein the at least one processor is configured to:

determine a source from which routing table information is to be obtained based, at least in part, on location data indicating the source;

receive configuration information from a device host (DH); and in response to the location data indicating that a near-field communication controller (NFCC) is configured to receive the routing table information from one or more secure computing environments or from the DH:

remove DH-based routing table information included in the configuration information so that routing table information, different from the DH-based routing table information, from a secured source can be loaded into one or more data routing tables of the NFCC, and obtain secure routing table information from at least one of the one or more secure computing environments to be loaded into the one or more data routing tables of the NFCC.

38. The apparatus of claim 37, wherein the at least one processor configured to determine the source is configured to:

determine that one or more routing table location option bits are set to allow the NFCC to receive the routing table information from the one or more secure computing environments or from the DH.

39. The apparatus of claim 38, wherein the one or more routing table location option bits are unchangeable and stored on a non-volatile memory.

40. The apparatus of claim 38, wherein the one or more routing table location option bits are changeable.

41. The apparatus of claim 37, wherein the at least one processor configured to remove the DH-based routing table information included in the received configuration information is configured to perform one of:

discard the DH-based routing table information included in the configuration information received from the DH; and store the DH-based routing table information included in the configuration information received from the DH.

42. The apparatus of claim 37, wherein the at least one processor is further configured to:

in response to a determination of failure to obtain the secure routing table information from the at least one of the one or more secure computing environments, obtain the DH-based routing table information, wherein the at least one processor configured to obtain the DH-based table information is configured to perform one of:

obtain the DH-based routing table information stored at the DH, and obtain the removed routing table information from a storage device coupled to the NFCC, the storage device storing the removed DH-based routing table information after the removal of the DH-based routing table information from the configuration information received from the DH.

43. The apparatus of claim 37, wherein the one or more secure computing environments include a first secure computing environment and a second secure computing environment, and wherein the at least one processor is further configured to:

receive first routing table information associated with the first secure computing environment and second routing table information associated with the second secure computing environment, and select the first routing table information.

44. The apparatus of claim 43, wherein the at least one processor is further configured to:

select the first routing table information and the second routing table information; and combine the first routing table information and the second routing table information to produce a hybrid routing table.

45. The apparatus of claim 37, wherein the at least one processor is further configured to:

receive secure routing table information priority data associated with the one or more secure computing environments; and determine based on the received secure routing table information priority data whether to utilize the secure routing table information obtained from the at least one of the one or more secure computing environments or to obtain the DH-based routing table information from the DH.

46. The apparatus of claim 37, wherein the at least one of the one or more secure computing environments is selected from the group consisting of a secure element, a virtual secure element, an NFC execution environment, a smart card, a universal integrated circuit card, a subscriber identity module, an SD Card containing the secure computing environment, and a Universal Serial Bus (USB)-based device containing the secure computing environment.

47. The apparatus of claim 37, wherein the one or more secure computing environments are removable.

48. The apparatus of claim 37, wherein the one or more secure computing environments are fixed.

* * * * *